US010918954B2

(12) United States Patent
Lohstroh et al.

(10) Patent No.: US 10,918,954 B2
(45) Date of Patent: *Feb. 16, 2021

(54) NOTIFYING USERS OF ACTIONS IN CROSS-PLATFORM ENVIRONMENTS

(71) Applicant: Zynga Inc., San Francisco, CA (US)

(72) Inventors: Shawn Lohstroh, Plano, TX (US); Geoff Dagley, San Francisco, CA (US); Justin Rouse, Dallas, TX (US)

(73) Assignee: Zynga Inc., San Francisco, CA (US)

( * ) Notice: Subject to any disclaimer, the term of this patent is extended or adjusted under 35 U.S.C. 154(b) by 271 days.

This patent is subject to a terminal disclaimer.

(21) Appl. No.: 14/744,620

(22) Filed: Jun. 19, 2015

(65) Prior Publication Data

US 2015/0283464 A1 Oct. 8, 2015

Related U.S. Application Data

(63) Continuation of application No. 13/226,979, filed on Sep. 7, 2011, now Pat. No. 9,061,211.

(51) Int. Cl.
| | | |
|---|---|---|
| *A63F 13/79* | (2014.01) | |
| *A63F 13/30* | (2014.01) | |
| *A63F 13/31* | (2014.01) | |
| *H04W 4/12* | (2009.01) | |
| *A63F 13/35* | (2014.01) | |

(Continued)

(52) U.S. Cl.
CPC ............. *A63F 13/79* (2014.09); *A63F 13/30* (2014.09); *A63F 13/31* (2014.09); *A63F 13/35* (2014.09); *H04L 67/28* (2013.01); *H04L 67/32* (2013.01); *H04L 67/38* (2013.01); *H04W 4/12* (2013.01); *A63F 2300/537* (2013.01); *G06F 2221/2101* (2013.01); *G06F 2221/2109* (2013.01); *G06F 2221/2117* (2013.01)

(58) Field of Classification Search
CPC .......... A63F 13/79; A63F 13/30; A63F 13/31; A63F 13/35; A63F 2300/537; H04L 67/28; H04L 67/32; H04L 67/38; H04W 4/12

See application file for complete search history.

(56) References Cited

U.S. PATENT DOCUMENTS

| 2010/0049852 | A1* | 2/2010 | Whitnah | G06Q 10/10 709/226 |
|---|---|---|---|---|
| 2010/0216553 | A1* | 8/2010 | Chudley | A63F 13/55 463/42 |

(Continued)

*Primary Examiner* — Tramar Y Harper
*Assistant Examiner* — Jeffrey K Wong
(74) *Attorney, Agent, or Firm* — Schwegman Lundberg & Woessner, P.A.

(57) ABSTRACT

A gameplay notification system receives gameplay indications and notification configuration information from a gameplay system. The gameplay indications and configuration information are stored in a platform queue corresponding to a client device platform type. Further configuration information may be received from various gameplay devices of a user. The notification configuration information is analyzed by the gameplay notification system to schedule transmission of gameplay notifications to various client device platform types. The notifications are sent to the corresponding client devices according to frequency, day of the week, and notification states, among other configuration settings, that pertain to a user and the user's corresponding client devices.

15 Claims, 7 Drawing Sheets

(51) Int. Cl.
  *H04L 29/06*   (2006.01)
  *H04L 29/08*   (2006.01)

(56) References Cited

U.S. PATENT DOCUMENTS

| | | | |
|---|---|---|---|
| 2012/0108320 A1* | 5/2012 | Ye ........................... | A63F 13/87 463/25 |
| 2012/0112908 A1* | 5/2012 | Prykari ................... | H04L 67/26 340/540 |
| 2012/0198002 A1* | 8/2012 | Goulart ................... | H04L 51/36 709/206 |
| 2012/0278475 A1* | 11/2012 | Papakipos ............... | G06Q 10/10 709/224 |
| 2012/0315993 A1* | 12/2012 | Dumont .............. | G07F 17/3225 463/42 |

* cited by examiner

NOTIFYING USERS OF ACTIONS IN CROSS-PLATFORM ENVIRONMENTS

RELATED APPLICATION

This application is a continuation of U.S. patent application Ser. No. 13/226,979, filed on Sep. 7, 2011, which is incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2011, Zynga, Inc. All rights reserved.

TECHNICAL FIELD

This patent document pertains to games and applications in general, and more particularly, but not by way of limitation, to online social games.

BACKGROUND

In network-based asynchronous games involving two or more players, users submit gameplay moves at their own pace. A user may not always have an application or game open, and therefore, is not always able to monitor the moves of other players and determine an opportunity for inputting a next move. Additionally, a user may participate in multiple games and multiple instances of the same game across many different types of gameplay platforms. This diversity adds to the challenge of being able to track gameplay actions and notify users of gameplay progress.

BRIEF DESCRIPTION OF DRAWINGS

Some embodiments are illustrated by way of example and not limitation in the figures of the accompanying drawings in which.

DESCRIPTION

Figure 1:
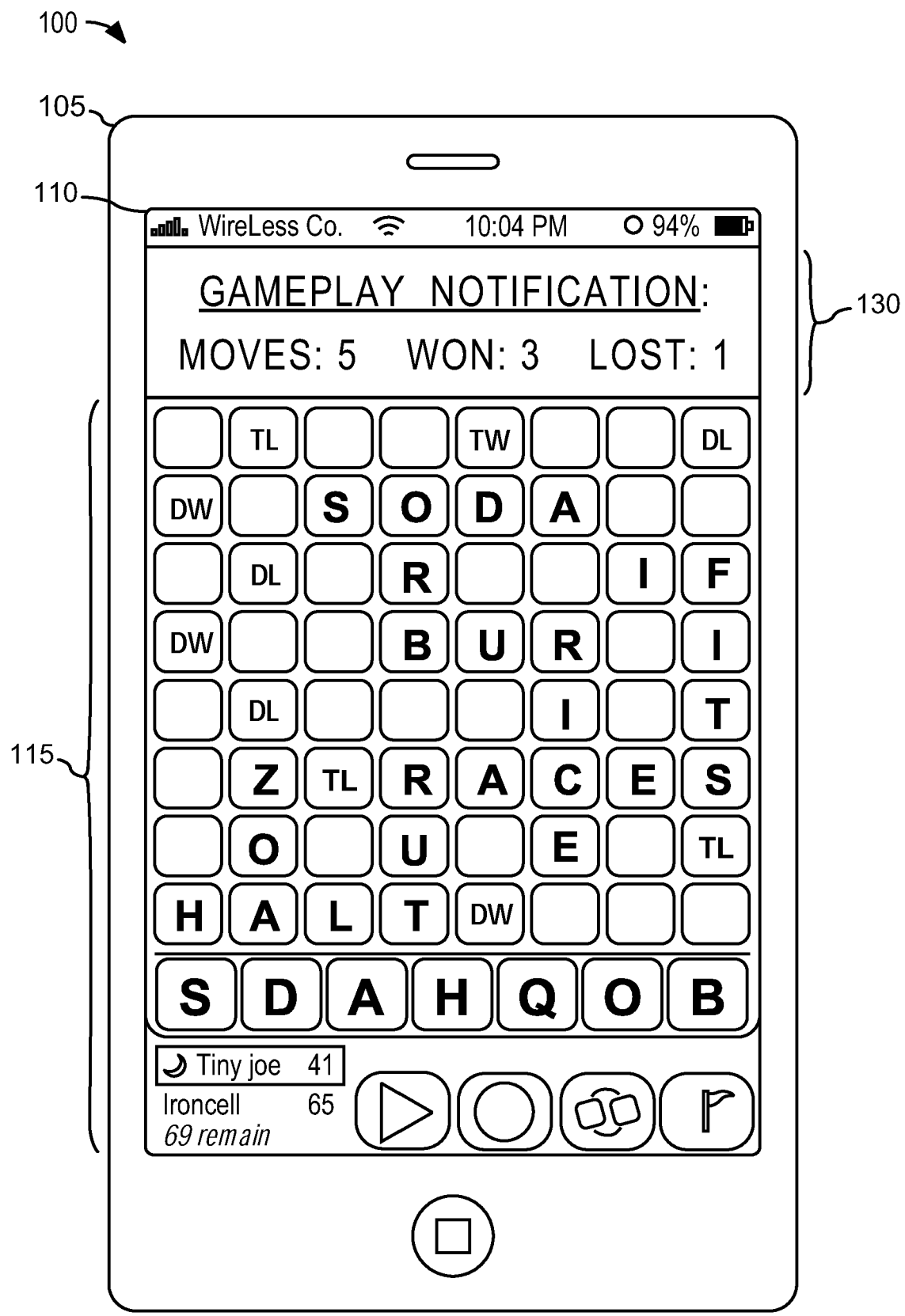
FIG. 1 is a diagram of a client device suitable for online gameplay and receipt of notifications, according to some embodiments.

In the following description, for purposes of explanation, numerous specific details are set forth in order to provide a thorough understanding of some example embodiments. It will be evident, however, to one skilled in the art that the present invention may be practiced without these specific details.

Environment

Presently, online games may be played on a broad variety of devices. One typical example of a gameplay device platform is a smart phone where the display may be used to show the gaming environment and a touch screen may be used by the user to enter gameplay interactions. The smart phone is just one platform type utilized in contemporary online gameplay environments. Multiple users can interact with any of the various gameplay device types to engage in online gaming sessions. Gameplay sessions may be conducted through a game server and communicated with the respective gameplay devices through a network, such as the Internet.

A notification server may be coupled through a network, such as the Internet, to the game server and receive indications of gameplay moves from the game server. The notification server may receive indications of gameplay moves (gameplay indications) and not necessarily receive every detail of each gameplay move conducted through the game server. The notification server may receive multiple gameplay indications before a notification is required or desired to be sent to a user. The user may specify a particular scheduling of gameplay notifications that causes the notification server to accumulate gameplay indications until a user-requested scheduling event occurs. The notification server is responsible for collecting the gameplay indications, generating gameplay notifications containing the appropriate accumulation of the gameplay indications, and scheduling the gameplay notifications.

The notification server is additionally responsible for delivering the notifications to the respective client devices of each user. Client devices may have a corresponding client device platform type (e.g., an iPad, iPhone, smartphone, desktop computer, etc.). A client device may serve as a user's gameplay device, gameplay notification device, or both. Gameplay notifications are distributed according to device type. Accordingly, the user's client device may be referred to as a client device of a certain platform type. Client device may mean a device used exclusively for gameplay, exclusively for notifications, or a combination of both. For example, the client device platform type may be a cell phone (non-smartphone) and may not be used for gameplay, but rather only for gameplay notifications by the user.

The notification server may store the gameplay indications in one or more queues each corresponding to an associated platform type. For example, gameplay indications may be routed to an iOS® platform queue and an Android™ platform queue corresponding to an iPhone® and a DROID™ phone respectively. Many different types of client devices may correspond to the same platform queue type. For example, the EVO 4G™, EPIC 4G™, and DROID™ smartphones may each be associated with the Android™ platform queue. Particular logic within each platform queue may handle scheduling and notification delivery to each user on each of their respective client devices. Delivery and scheduling is conducted according to configuration information received from the user by the notification server.

The online games may be facilitated through social networks or directly from dedicated game websites or applications. During the course of gameplay, many opportunities exist for users to receive game-related notifications on one or more gameplay platforms as well as on non-gameplay platforms as the user may configure.

Many types of games involve two or more players where each player may participate in the game from their respective gaming device. Even in single-player games, certain instances in the course of gameplay may invite a user to be involved in gameplay notifications, including messages, with other players of the same type of game. Players may want to get answers to questions about playing a game or share gaming related experiences. Some games, whether single- or multi-player games, have opportunities for the exchange of gaming items such as currency (real or game-based) and game-related credits, acquisitions, or trophies. In some embodiments, online games from Zynga, Inc., which include Treasure Isle™, allow users to share treasures such as gems, for example, with other gameplay friends when such items are found in the course of gameplay. Any of the game related questions, gameplay experiences, or notifications from the gameplay system, as well as gameplay status notifications may be desired for receipt by the user on any of a number of Internet connected platforms.

Managing and routing the various gameplay notifications to the various platform types of all users according to each user's desired schedule presents a tremendous challenge to an online game provider. In addition, the vast numbers of new users entering online gaming and the increasing number of available online games to new and existing users creates a tremendous challenge for gaming producers to provide a scalable gaming notification system.

FIG. 1 depicts a gameplay system 100 in the form of a client device 105 which may be, for example, a smartphone. A gameplay system 100 may also be embodied, for example, as a desktop computer, a deskside computer, a terminal, a personal data assistant, an electronic tablet, or a notebook computer (none of which are shown). The gameplay system 100 is configurable to execute one or more games, either in the form of standalone applications or as games executing within a web browser application. The gameplay system 100 may also be referred to as a device of a particular platform type. The client device 105 may include a display 110, which in some embodiments, may have at least a portion of the display area transparently overlaid with a touch screen 115. A game that the client device 105 is involved in may be executed partially by a game server and partially by the client device 105. When the client device 105 executes the client portion of a game, an upper portion of the display may be a gameplay notification area 130 where indications of gameplay or, alternatively, complete gameplay notifications may be displayed. The game play notification area 130 is typically provided by the particular game being played by the user as a portion of the display 110 under control by the game.

The touch screen 115 may be that portion of the display 110 where online games are displayed. This may also be the area where a user may engage with a game session by interacting with the portion of the touch screen 115 overlaying display elements of an online gaming session. In some embodiments, the user may engage with the game session via one or more input devices, such as a mouse, keyboard, stylus, trackpad, trackball, and so forth. As move possibilities present themselves or as user prompts for interaction are displayed on the display 110, a user may touch, tap, or click and drag, for example, on the touch screen 115 directly above a desired element and enter their desired interactions with the present gameplay session. Additionally, a user may be able to input gaming moves according to certain keystrokes applied through a keyboard (via touch screen or keyboard hardware) or other special keys on the client device 105. A particular set of the user's interactions with the client device 105 may be the input that constitutes "their turn" in gameplay.

After taking their turn, a first user may have to wait for a second user to take their turn. During their wait, the first user may be able to see indications of certain moves as they are developed through interactions by a second user on their respective device and subsequent to their being submitted to a game server. Once the second user has completed their input through interactions with their device and their move is complete, the gameplay notification area 130 may indicate an increment in the number of moves, or alternately, give an indication that the second user's move is complete. The gameplay notification area 130 may provide indications of gameplay action for other gameplay sessions, including other games and game instances, in addition to indications created in relation to the game in progress in the present online gaming session. The gameplay notification area 130 may also present gameplay notifications from multiple sessions of the same type of game being played by the first user with other users as well as gameplay notifications from multiple sessions of multiple other games that the first user is involved in.

In some embodiments, there may be a considerable amount of time lapse before the second user enters their move. The first user may not want to, or may not be able to wait to witness the move of the second user during the present gameplay session. In order to be free from monitoring the client device 105 for an indication of gameplay action(s) by the second user, the first user may have gameplay notifications stored and transmitted at scheduled times for later retrieval at a further gaming session, on a different notification platform type, or via one or more communication channels (e.g., email, SMS). The gameplay notifications may be available in the gameplay notification area 130 of a game executing on the client device 105, for example, at a later time when the first user logs into a further session of the game with the second user. Alternatively, gameplay notifications may be available in the gameplay notification area 130 when the first user logs into an alternate gameplay session of a different game with a different user on a different client device platform type. These gameplay notifications may include updates of the initial game with the second user. Additionally, the user may receive gameplay notifications in the gameplay notification area 130 when the first user is engaged with an application being displayed on the display 110 that is unrelated to gameplay.

In reference to a general game user, the gameplay notifications received by the user on the client device 105 may be configured by a notification server (discussed below). Other sets of gameplay notifications may be configured by the notification server. For example, gameplay notifications corresponding to particular instances of game sessions, and in turn corresponding to various game types, may be configured to be transmitted to particular additional devices operated by the user. Not every type of game or every particular gameplay session need have respective gameplay notifications transmitted to all notification devices and device types. The user may be in control of the configuration of gameplay notifications for each game of several different types of game to each client device platform of several different types of client device platforms.

The type of device that gameplay notifications may be transmitted to (client device type) need not be the particular device or the same type of device that the user uses to play the game. For instance, an electronic tablet may be used by the user at their place of work and be used to receive gameplay notifications corresponding to a particular configuration and selection of games the user participates in. However, the user may not be involved in gameplay using the electronic tablet at work. The user may have an additional electronic tablet at home which may also receive gameplay notifications and be used for entering gameplay actions. Alternately, the user may use an electronic tablet for gameplay and have gameplay notifications transmitted to a personal computer, a terminal, a smartphone, as well as the same electronic tablet. Gameplay notifications for any number of instances of a particular type of game, as well as notifications for any number of types of games with any number of corresponding instances of gameplay, may be configured for transmission to any combination of devices of any type.

Additionally, gameplay notifications may be configured for transmission by e-mail, SMS messages, real-time messages, or chat or instant messages to any device capable of receiving such communications. Devices receiving gameplay notifications by such communication channels may typically be a type of platform not used for gameplay, for instance. For example, SMS messages may be received on a non-smartphone mobile platform.

Figure 2:
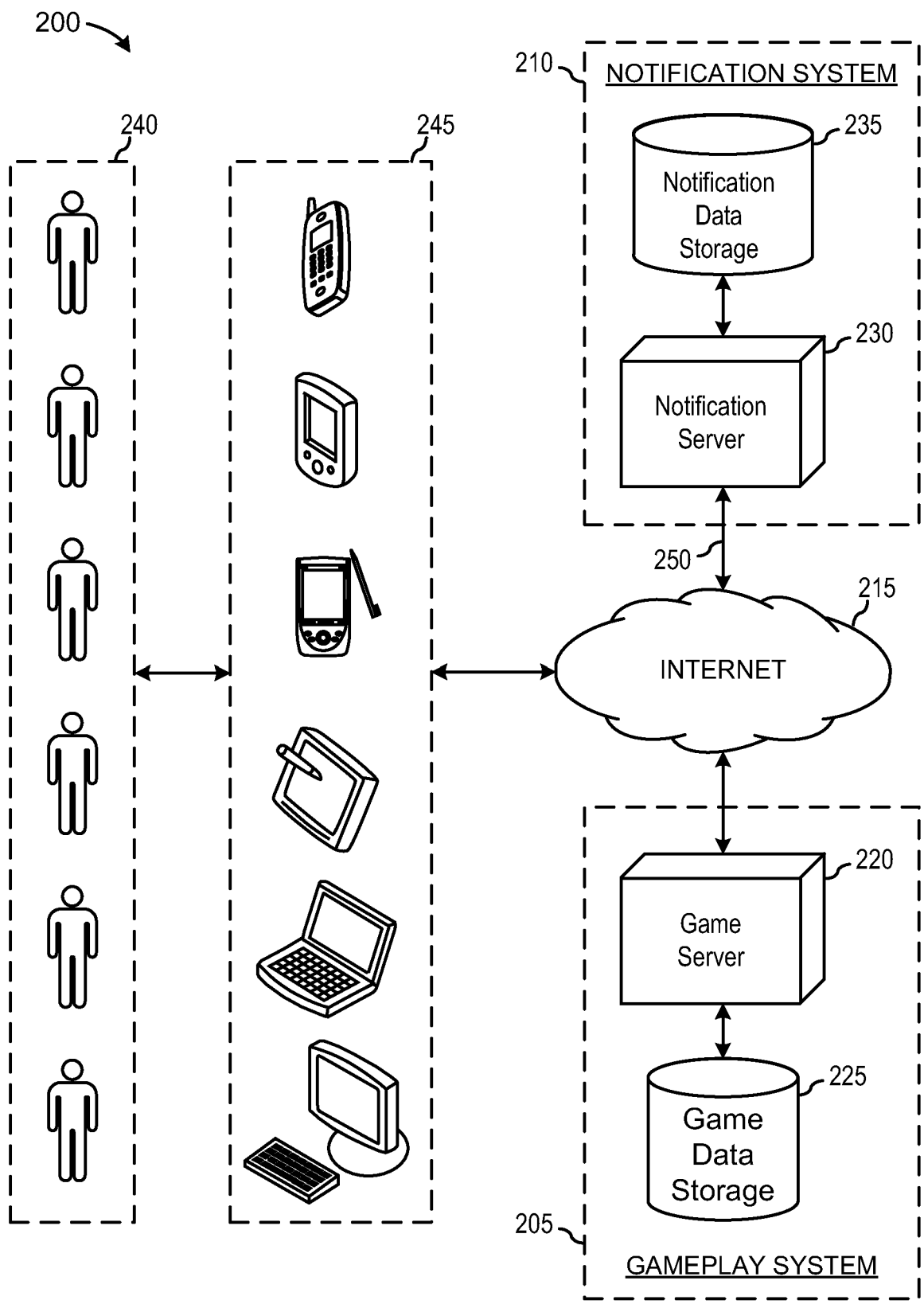
FIG. 2 is a block diagram representation of an online gaming system and gameplay notification system, as may be used in some embodiments.

FIG. 2 depicts a gameplay environment 200 including a gameplay system 205 and a gameplay notification system 210. The gameplay environment 200 is an example embodiment of an online network for gameplay between multiple users 240 utilizing various gameplay platform types 245 that may be facilitated by the Internet 215. The gameplay system 205 may include a game server 220 and game data storage 225. The gameplay system 205 maintains communication with the various gameplay platform types 245 of the multiple users 240 participating in multiple types of games. The gameplay system 205 may facilitate each gameplay session and manage transmissions between gameplay terminals during gaming sessions on the respective various gameplay platform types 245 incorporated by the multiple users 240. The gameplay system 205 may maintain all details of gameplay actions as well as abbreviated indications of the gameplay interactions between users. Additionally, the gameplay system 205 mirrors gameplay input actions to the further users involved in each respective gaming session and maintains additional indications of interactions between multiple users 240 in order to support further progress in the games facilitated by the game server 220. An example of these additional interactions between users may be messaging between users during gameplay. All gameplay actions and related messaging may be stored on the game data storage 225.

The gameplay system 205 may be communicatively coupled through the Internet 215 and an Internet bus 250 to the gameplay notification system 210. The gameplay notification system 210 may include a notification server 230 and notification data storage 235. Each of the gameplay actions that the game server 220 is involved in and that may be stored in the game data storage 225 may also be communicated to the notification server 230 and correspondingly stored in the notification data storage 235. The storage of the gameplay indications (i.e., where indications may be abbreviations of complete gameplay actions) in the notification data storage 235 may be thought of as constituting both a warehousing and mirroring of the totality of gameplay indications available to the game server 220. Based on this warehousing and mirroring of all gameplay indications, the notification server 230 has a complete set of information with which to manage configuration of gameplay notifications (further described below) to the multiple users 240 involved in all of the games.

A gameplay system 205 and the gameplay notification system 210 may be communicatively coupled through the Internet 215 to multiple users 240. The multiple users 240 may be communicatively coupled through a particular device, selected from various gameplay platform types 245, to the Internet 215, the gameplay system 205 and the gameplay notification system 210. The various gameplay platform types 245 may include a cell phone, a smart phone, a personal data assistant, an electronic tablet, a notebook computer, a desktop computer, a deskside computer, and a terminal, for example. Any particular one of the various gameplay platform types 245 may be used by the respective user for gameplay, gameplay notifications, or a combination of both gameplay and gameplay notifications. A particular user may have multiple of the various gameplay platform types 245 for any combination of gameplay input and gameplay notifications.

A typical game may involve at least two players taking successive turns at gameplay actions until one of the players wins the game. The game server 220 may serve multiple gaming applications to various sets of the multiple users 240. Any one of the multiple users 240 may be involved with several of the other multiple users 240 in multiple instances of the same game and in multiple types of games at the same time. The notification server 230 receives indications of each move by each of the multiple users 240 in gameplay action.

A typical user of the multiple users 240 may not be able to be in continuous and concurrent attendance with another user of the same game during a gaming session. The typical user may desire to be informed about the completion of a pending move by another user. The typical user may also have multiple device types or platform types upon which the user may desire to have gameplay notifications communicated to. With the multitude of gaming sessions being played across multiple game types corresponding to each of the multiple users 240 there may be a critical demand created for a notification configuration within the notification server 230.

System

Figure 3:
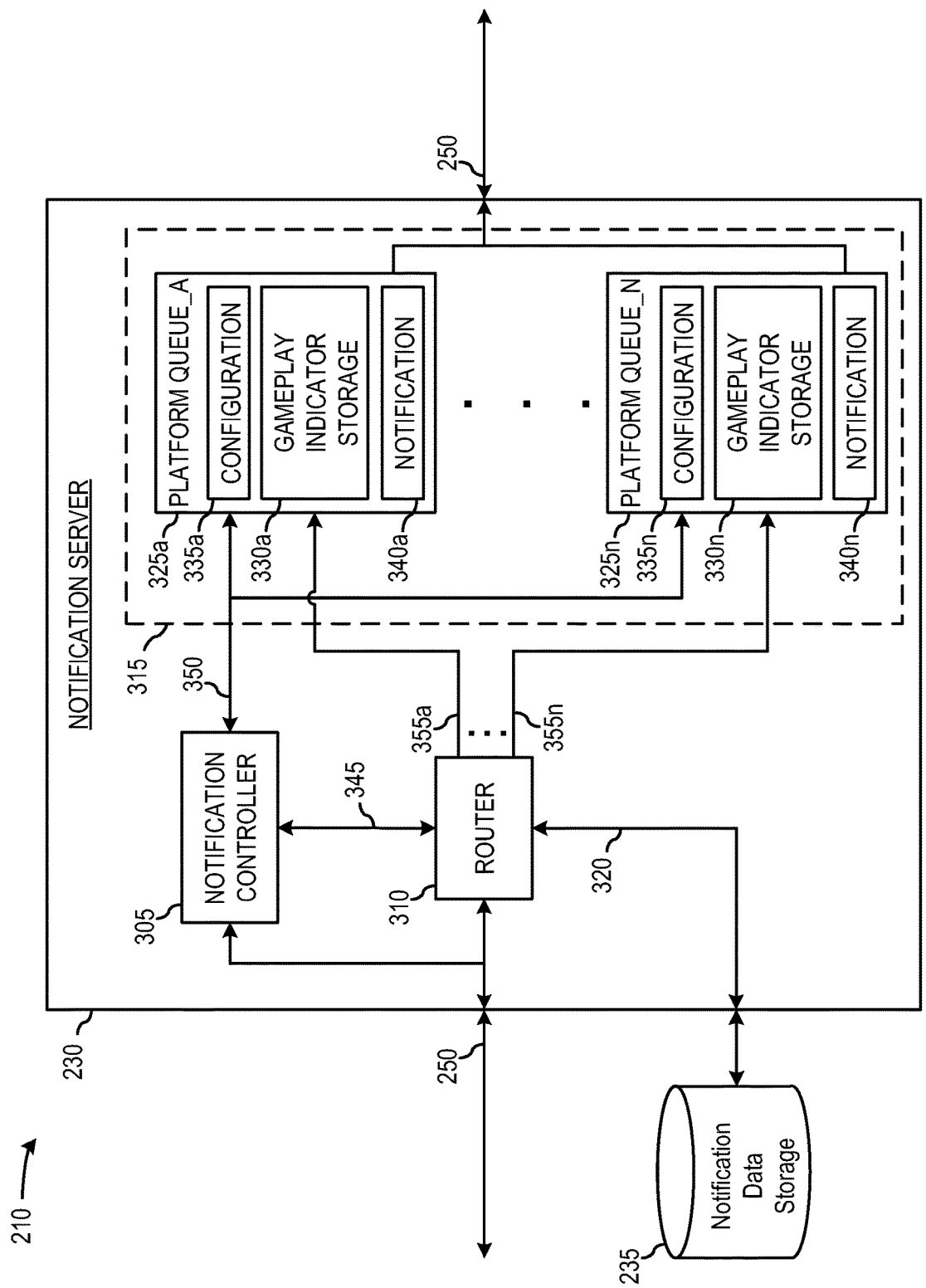
FIG. 3 is a block diagram illustrating a gameplay notification server, according to some embodiments.

FIG. 3 depicts the gameplay notification system 210 (FIG. 2) which may manage gameplay notifications to users of online games. The notification system 210 includes the notification server 230 and the notification data storage 235 according to one exemplary embodiment. The notification server 230 includes a notification controller 305, a router 310, and a platform queue array 315. The notification controller 305, the router 310, and the platform queue array 315 maybe communicatively coupled to the gameplay system 205 (FIG. 2), the various gameplay platform types 245, and the multiple users 240 through the Internet bus 250.

The notification controller 305 may be communicatively coupled to the Internet through the Internet bus 250, to the router 310 through a router bus 345, and to the platform queue array 315 through a platform queue bus 350. The notification controller 305 may control the routing of gameplay related information through the router 310 to the notification data storage 235 and to the platform queue array 315. Alternately, the notification controller 305 may communicate with the platform queue array through the platform queue bus 350.

In continuing reference to the embodiment of FIG. 3, the router 310 is communicatively coupled to the notification data storage 235 through a storage bus 320. The storage bus 320 may communicate general gameplay notification information including platform queue configuration information, gameplay move information, gameplay related messages, and gameplay status information, for example. The router 310 is also communicatively coupled to the platform queue array 315 through a platform router bus 355a-355n. Any portion of or all of the general gameplay notification information may be routed from the Internet bus 250 to the platform queue array 315 through the router 310.

The platform queue array 315 may include a number of platform queues (platform queues a-n 325a-325n), each corresponding to a particular notification platform type. The platform queues in the platform queue array 315 may include a queue for Android™ type platforms, a further queue for IOS® platforms (e.g., iPhone, iPad, etc.), and yet another queue for platforms capable of receiving short message service (SMS) messages, for example. Additional notification platform types may include online social networking sites such as Facebook®, Twitter®, and LinkedIn®, for example.

Each of the platform queues a-n 325a-325n may include gameplay indicator storage 330a-330n, a configuration module 335a-335n, and a notification module 340a-340n. The gameplay indicator storage 330a-330n may receive gameplay indicators from the gameplay system 205 over the platform router bus 355a-355n during the course of gameplay which may occur across multiple gaming devices and platform types, for example. Gameplay indicators from multiple gaming platform types are stored in respective ones of the platform queues a-n 325a-325n according to notification platform type. The gameplay indicator storage 330a-330n may also receive configuration information for casual storage purposes. The configuration module 335a-335n may receive configuration information (discussed below) and control information from the notification controller 305 over the platform queue bus 350. The configuration module 335a-335n may maintain identifiers in a platform registry of client devices receiving gameplay notifications along with indicators of the type of notifications each client is to receive.

The notification controller 305 may acquire information from a user's device for configuring the initial setup of new platform queues a-n 325a-325n corresponding to the device type of the user's notification devices. This initial setup and configuration of corresponding platform queues a-n 325a-325n may be triggered by the first use of a user's device. In some embodiments, the initial setup is triggered when the user's device is a new device type not recognized within the notification system, and the new device is both a gaming platform and a notification platform. Alternatively, the first use of a user's device may be used to set up multiple platform queues a-n 325a-325n for several different gameplay notification platform types. On first use of the new device new platform queues a-n 325a-325n may be initialized with default configuration and scheduling settings until the user may initiate other configuration input.

Utilizing the Internet bus 250, the notification controller 305 may produce a graphical user interface (GUI, not shown) for obtaining notification configuration information on the display of any one of the various gameplay platform types 245. This interface may be referred to as the notification configuration GUI. The configuration information received through the notification configuration GUI may specify a notification platform type, scheduling specifications for gameplay notifications and a maximum number of initiated messages that is not to be exceeded in a specified period of time for the particular notification platform type. For example, when the number of initiated messages exceeds a given limit, Facebook® (according to rules which may be in force at the social networking site) blocks all further messages. When given a maximum number of initiated messages, the gameplay notification system 210 may manage the accumulation of gameplay indicators into a number of gameplay notifications that do not exceed the maximum number of initiated messages for a particular notification platform type. Additionally, gameplay notifications may be initialized by the user through a user-selectable link within each gaming session, through a setup option in the user's account (corresponding to any of a number of various gaming or notification platforms), and by accepting an invitation sent in an e-mail.

When the specified notification platform type is not known to the notification system a new platform queue a-n 325a-325n may be initialized with default configuration and scheduling settings. The user may proceed with entering further scheduling and platform type information beyond the defaults through the notification configuration GUI. The scheduling configuration information and platform type information entered by the user may be analyzed by the notification controller 305 and used to produce scheduling details, specific platform queue a-n 325a-325n configuration information, and control inputs which may be communicated to the respective platform queue a-n 325a-325n over the platform queue bus 350. Certain configuration information such as scheduling configuration information, may be stored in the respective configuration modules 335a-335n within each platform queue a-n 325a-325n for retention and later used by the respective notification module 340a-340n to produce a final gameplay notification delivery schedule.

Along with the notification platform type the notification controller 305 may acquire additional notification platform configuration information through the GUI such as a user specified name that may be input as a platform identifier. Alternatively, the notification controller 305 may obtain a permanent identifier (PID) directly from the device being configured. The PID uniquely identifies the device intended for gameplay notifications and may be used singly or in combination with the user specified name to form the platform identifier. In some embodiments, the PID may be known by different names depending on the device. For example, the PID may be known as a unique device identifier (UDID), a device ID, or an Android ID. The platform identifier including the user specified name or the PID, or both, may be used to register the notification platform in the platform registry maintained by the notification controller 305, and be stored distributively across the configuration modules 335a-335n, which in turn may be kept within a corresponding platform queue a-n 325a-325n. The GUI may also include user-selectable switches to turn notifications on/off or enable various notification types on a per-platform basis, such as e-mail and SMS.

The notification controller 305 may determine further settings directly from the device that may be inherent to the device's particular notification platform type. These inherent settings may correspond to the type of operating system used by the notification platform, which may be, for example, iOS-based notifications (utilizing push notifications to iPhone and iPad, for example), Android™-based notifications (which may be done through push notifications on some OSs but may require background polling in other OSs), Facebook® (wall-to-wall requests and messages), and Blackberry. For further resolution of gameplay indications by platform type, different platform queues a-n 325a-325n may be established, for example, for the iPhone and iPad platforms, even though they may share the same OS. This level of resolution may enhance the scaling ability of the gameplay notification system 210 and allow easier adaptation to rules or protocol changes within each platform type.

The notification module 340a-340n handles the intricacies of scheduling options by which the user may want to receive gameplay notifications. Gameplay notifications may be configured by scheduling information received through the notification configuration GUI and may range in delivery time from immediate notifications to delayed notifications. Delayed notifications may be configured to occur at a certain time of day with a certain frequency (e.g., daily, every other day, or weekly), which may be stored in a frequency of notification indicator, or on a certain day or days of the week. Delayed gameplay notifications may be the accumulation of many gameplay indicators which have been collected since a previous notification was sent. This accumulation mode of gameplay indicators may also be the fundamental mode for generating gameplay notifications for delivery by e-mail or SMS.

Scheduling details may also include a conditional delivery status in which gameplay notifications may or may not occur depending on the particular status a user happens to have set. Conditional delivery status may include statuses such as working, vacation, work-related conference, at home, weekend, or open, for example. A user may determine the delivery or postponement of delivery of gameplay notifications during any one of the status conditions. For example, the user may indicate to the gameplay notification system 210 that they may be in a work-related conference, and the notification module 340a-340n may postpone delivery of gameplay notifications until the user changes the status condition or the amount of time allotted for the work-related conference condition transpires.

Each notification module 340a-340n handles the scheduling of gameplay notifications to devices of the platform type associated with corresponding platform queues a-n 325a-325n. The distribution of notification logic on a per-queue basis allows for scaling platform queues a-n 325a-325n with ease and with ready adaptation to changes in the logistics or rules for communicating with a particular platform type (e.g., changes in the communication protocol for a particular platform type). The scheduling details may be carried out by the notification module 340a-340n in conjunction with registry details and scheduling configuration information retained in the configuration module 335a-335n and may be controlled in collaboration with the notification controller 305. For instance, the platforms registry retained in the adjoining configuration module 335a-335n may be utilized in determining the coordination of scheduling details, including handling the conditional delivery status, to a particular platform.

An additional scheduling detail implemented by the notification module 340a-340n is the cancellation of certain gameplay notifications when a user, who has a pending gameplay notification residing in a platform queue a-n 325a-325n, logs in to a gaming session with the corresponding gaming device. In this situation, the user may receive an immediate indication of gameplay indicators within the gaming session itself and the gameplay notification may no longer be necessary. The pending gameplay notification is therefore canceled by the corresponding notification module 340a-340n.

The notification controller 305 may monitor gameplay indication information and configuration information transmitted over the Internet bus 250 from the gameplay system 205 and/or the various gameplay platform types 245. The notification controller 305 may snoop the gameplay indication information and determine a game identifier, including the type of game and a game session identifier, one or more player identifiers of players targeted for receiving gameplay notifications, and one or more move indicators. The move indicators may be a summary of incremental moves completed by another user to conclude their move (i.e., their "turn") in the game. Not every detail of every move is necessary to be transmitted to the gameplay notification system 210 in order to create a move indicator.

The player identifier(s) is compared and matched with platform identifier(s) in the registries held in the configuration modules 335a-335n. When a player identifier matches a registry entry for one of the platform queues a-n 325a-325n, the accompanying move indicator(s) is routed to the corresponding gameplay indicator storage 330a-330n. The routing of the move indicator(s) is accomplished by the notification controller 305, after analysis of the gameplay notification information, by transmitting control information to the router 310 to route the gameplay indication information to the determined gameplay indicator storage 330a-330n of the corresponding one of the platform queues a-n 325a-325n.

Any or all of the gameplay notification information and configuration information transmitted over the Internet bus 250 from the gameplay system 205 and/or the various gameplay platform types 245 may also be routed to the notification data storage 235. For example, the configuration information transmitted from the various gameplay platform types 245 may be stored in the notification data storage 235 in order to provide the platform registry from a single storage location in contrast to the distributed approach where corresponding segments of the platform registry may be stored in each of configuration modules 335a-335n of the corresponding ones of the platform queues a-n 325a-325n. From this point, the notification module 340a-340n associated with each the platform queues a-n 325a-325n (discussed above) looks at the frequency and scheduling information details to determine the next delivery of gameplay notifications.

Example Methods

Figure 4:
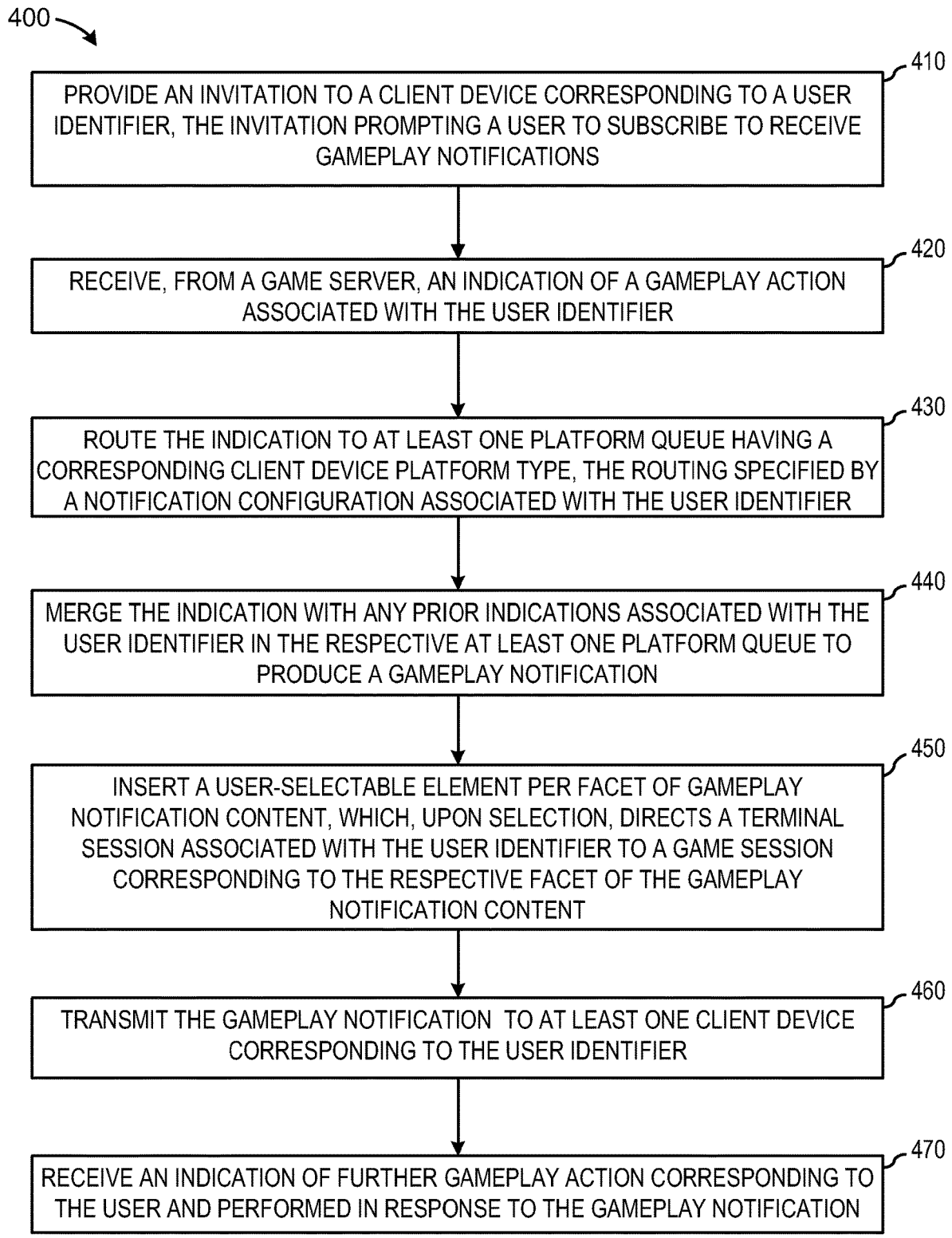
FIG. 4 is a flowchart illustrating an example process of receiving gameplay actions and configuring a corresponding notification to a user, according to some embodiments.

FIG. 4 depicts an example method of receiving 400 gameplay actions and configuring a corresponding notification to a user. The example method 400 commences with providing 410 an invitation to a client device having a user identifier corresponding to a user. The invitation prompts the user to subscribe to receiving gameplay notifications at any of several gaming platforms which the user may use in gameplay sessions. Additionally, the user may have additional devices which may not be involved in gameplay but are suitable for gameplay notifications. The invitation may be provided on a client device by way of a user-selectable element, such as a clickable link, for example, and may be provided in a gameplay session. Alternately, a user-selectable option may include the invitation for the user to subscribe to gameplay notifications and be provided in a listing of account settings viewable by the user. An additional alternative is the use of an e-mail provided to the client device which may contain the invitation for the user to subscribe to receiving gameplay notifications.

The method continues with receiving 420 an indication, from a game server, of a gameplay action associated with the user identifier and be a result of gameplay on the part of another user. The other user may make several gameplay actions in the course of a single move within a game being played with user. The indication of gameplay action may typically not include all game related actions entered by the other user, but rather generally include information that a move has been completed by the user and include certain status information regarding the respective game being played.

After receipt of the indication, the method proceeds with routing 430 the indication to one or more platform queues having a client device platform type corresponding to the devices configured by the user. The particular routing may be specified by a notification configuration associated with the user identifier and configured by the user. The method also includes merging 440 the indication with any prior indications that may exist and are associated with the user identifier. The merged indications may be stored in platform queues corresponding to the respective client device types. When merged, the accumulation of the indication and any prior indications that may have already been received in the platform queue produce a gameplay notification.

The method continues with inserting 450 a user-selectable element per facet of gameplay notification content. A gameplay indicator may correspond to a move in a single gameplay session and be a facet of the gameplay notification. When selected by the user, the user-selectable element may direct a terminal session associated with the user identifier to a respective gameplay session. In this way, a user may be immediately directed to a terminal session within the particular game session featured in the gameplay indicators of the gameplay notification. The user may see the user-selectable element in immediate association with a particular facet of the gameplay notification. A given gameplay notification may also include indications of prior moves by multiple other players within the same gameplay session as well as indications of gameplay actions in other gaming sessions. The respective facet of gameplay refers to gameplay indicators of a select gameplay session of interest to the user.

The method proceeds with transmitting 460, according to the notification configuration, the gameplay notification from the respective platform queue to at least one client device corresponding to the user identifier and having a client device platform type corresponding to the platform queue. The method concludes with receiving 470 an indication of further gameplay action corresponding to the user identifier and performed in response to the gameplay notification. In this way, the method of receiving 400 gameplay actions and configuring a corresponding notification to a user provides a gameplay notification to a user that entices production of a next move by the user in response to the gameplay notification.

Figure 5:
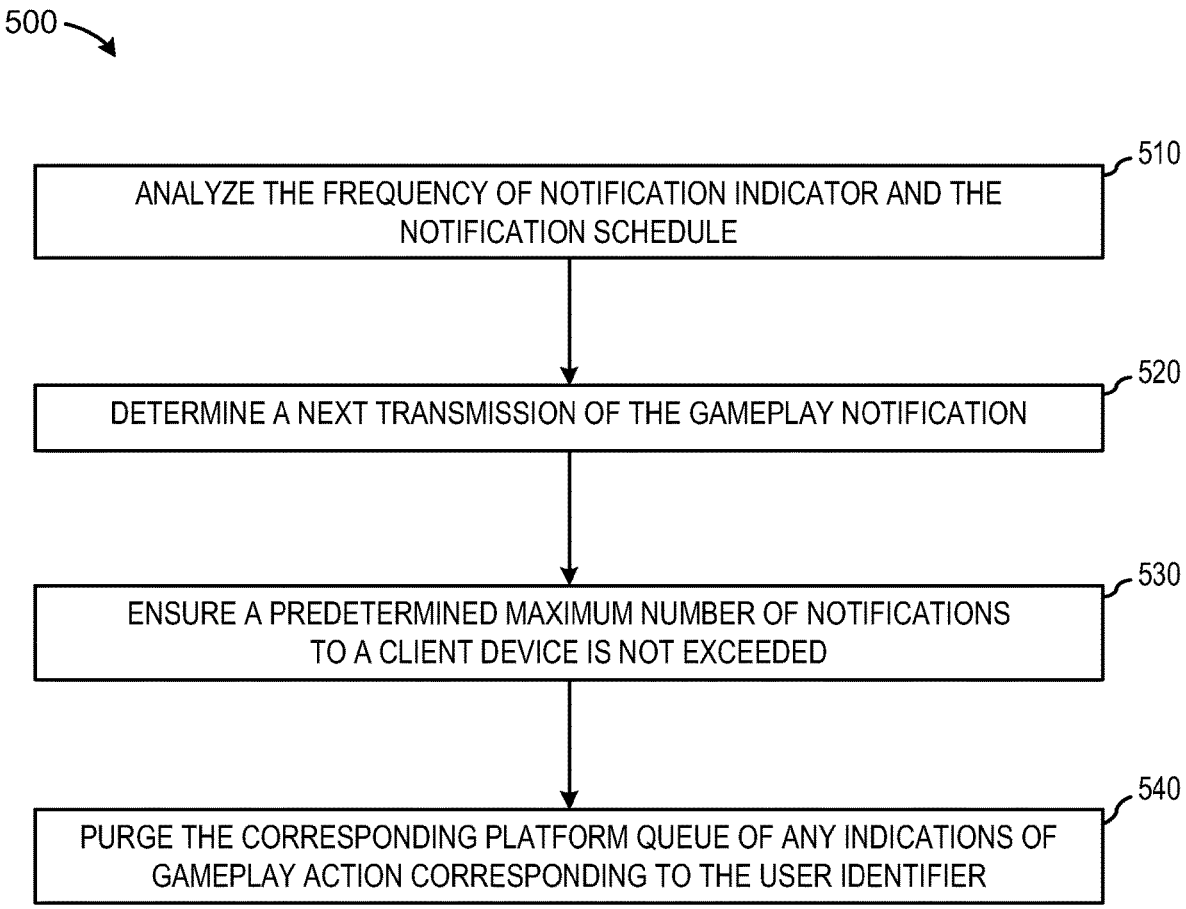
FIG. 5 is a flowchart illustrating an example process of managing gameplay notification transmissions and corresponding platform queues, according to some embodiments.

FIG. 5 is a flowchart illustrating a process of managing 500 gameplay notification transmissions and corresponding platform queues, according to some embodiments. The method commences with analyzing 510 the frequency of notification indicator and the notification schedule (discussed above in relation to notification modules 340a-340n and the handling of intricacies of scheduling). Responsive to analyzing the frequency of notification indicator and the notification schedule (which may be stored in the respective configuration modules 335a-335n), the method proceeds with determining 520 a next transmission of the gameplay notification.

Responsive to the analysis and determination of the next notification, the method continues with ensuring 530 that a predetermined maximum number of notifications to a client device is not exceeded. For example, if the number of initiated messages exceeds the specified limit, Facebook® (according to rules which may be in force at the social networking site) blocks all further messages. The frequency of notification indicator and platform type, along with any known maximum number of initiated messages within a given amount of time (when known) is taken into account during the analyzing and determining steps to make sure gameplay indicators may be accumulated over a long enough period of time to make sure that the maximum number of initiated messages is not exceeded. Subsequent to transmitting the gameplay notification the method continues by purging 540 the corresponding platform queue of any indications of gameplay action corresponding to the user identifier. The purging of the particular platform queue of gameplay indications reduces the queue for a new set of gameplay indicators, thereby ensuring that the player does not receive overlapping gameplay notifications.

Figure 6:
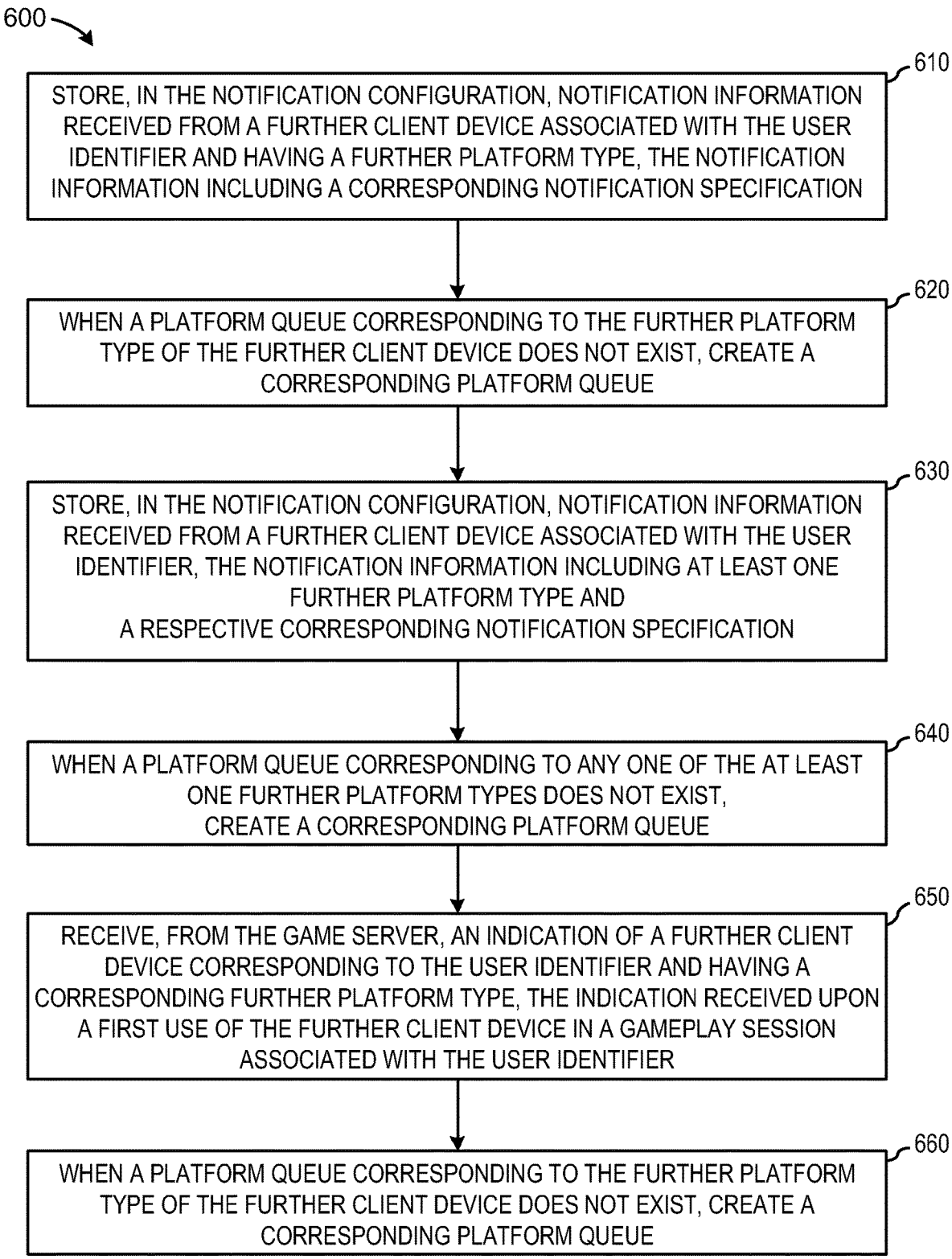
FIG. 6 is a flowchart illustrating an example process of managing gameplay notification configurations and creation of corresponding platform queues, according to some embodiments.

FIG. 6 is a flowchart illustrating a process of managing 600 gameplay notification configurations and creation of corresponding platform queues, according to some embodiments. The method commences with storing 610, in the notification configuration, notification information received from a further client device is associated with the user identifier and has a further platform type. The notification information may be received from the further client device by the user incorporating a manual entry process while utilizing the notification configuration GUI (discussed above). The notification information entered by the user may include a corresponding notification specification including a frequency of notification indicator, a notification schedule, and a platform identifier corresponding to the further client device of the user. When a platform queue corresponding to the further platform type of the further client device does not exist, the method continues with creating 620 a platform queue corresponding with the notification platform type of the further client device.

The method goes on with storing 630, into the notification configuration, notification information received from a further client device associated with the user identifier. The notification information includes a further platform type and a corresponding notification specification for each respective platform. The notification information includes a frequency of notification indicator, a notification schedule, and a platform identifier. When a platform queue corresponding to the further platform type does not exist, the method continues with creating 640 a corresponding platform queue.

The method goes on with receiving 650, from the game server 220, an indication of an additional client device corresponding to the user identifier with a corresponding platform type. The game server may transmit the indication upon receiving an indication of a first use of the further client device in a gameplay session associated with the user identifier. When a platform queue corresponding to the further platform type of the further client device does not exist, the method proceeds with creating 660 a platform queue corresponding with the notification platform type of the further client device.

Data Structures

The gameplay indicators received from the game server 220 may have a gameplay notification content including an accumulation of gameplay indicators based on a game type and a game session identifier. The gameplay notification indicators may include a number of completed moves, a number of pending moves, a number of wins, a number of losses, a number of conceded (and therefore lost) games, number of new games, a number of rematches available, and number of messages available. Each of the gameplay indicators, including indicators based on a per-game session basis, may have a corresponding user-selectable link that, when selected, redirects the terminal session of the user to the gaming session which has produced the gameplay indicator. In this way, the user may immediately have access to a gaming session that has produced the gameplay indicator and at the same time be able to differentiate among user-selectable links to multiple game sessions contributing to the gameplay notification content.

MODULES, COMPONENTS AND LOGIC

Certain embodiments may be described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules may be temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules may be configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that may be temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server may generally be remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture

Figure 7:
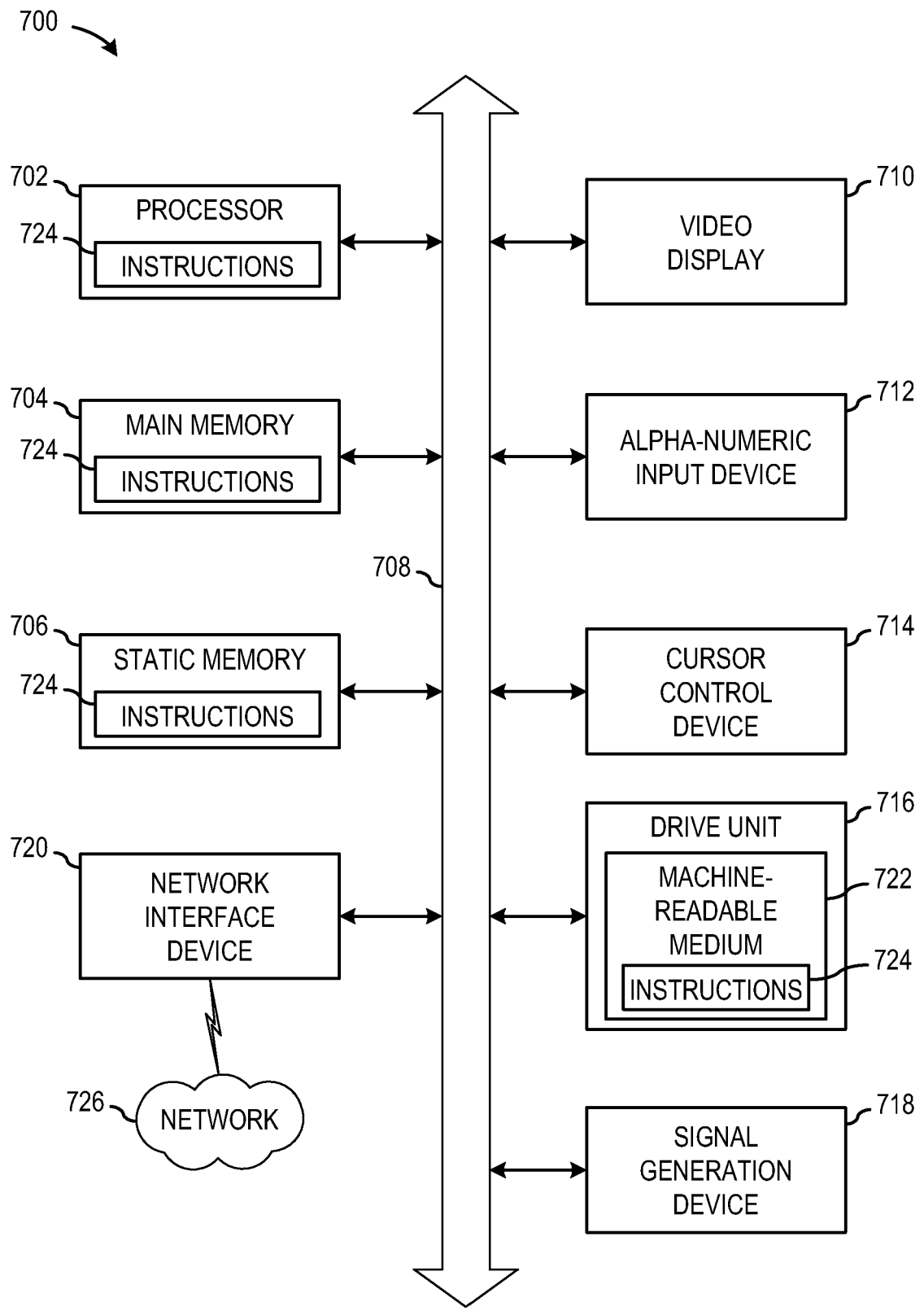
FIG. 7 is a block diagram of machine in the example form of a computer system, within which, a set instructions causes the machine to perform any one or more of the methodologies discussed herein, may be executed.

FIG. 7 is a block diagram of machine in the example form of a computer system 700 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a disk drive unit 716, a signal generation device 718 (e.g., a speaker) and a network interface device 720.

Machine-Readable Medium

The disk drive unit 716 includes a machine-readable medium 722 on which is stored one or more sets of instructions and data structures (e.g., software) 724 embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The Abstract is provided to comply with 37 C.F.R. § 1.72(b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. A method comprising:
receiving, from a game server, an indication of a gameplay action associated with a source user identifier;
responsive to receipt of the indication, routing the indication to one or more of a first target client device platform queue and a second target client device platform queue, the first and second target client device platform queues each having a respective notification configuration associated with a target user identifier, wherein each notification configuration includes a notification frequency and a user-defined notification schedule specific to notifications with respect to gameplay actions and specific to the respective target client device platform queue,
and wherein the target user identifier is associated with the first target client device platform queue and the second target client device platform queue, the first target client device platform being different than the second target client device platform;
analyzing the notification frequency and the notification schedules associated with the target user identifier;
responsive to analyzing the frequency of notification and the notification schedules, determining when a next gameplay notification transmission occurs;
responsive to determining when the next gameplay notification occurs, ensuring a predetermined maximum number of notifications to a client device is not exceeded;
merging the indication with any prior indications of gameplay action, associated with the source user identifier, in the first and second target client device platform queues to produce a current gameplay notification, the current gameplay notification including user-selectable notification content representative of a corresponding gaming session in which an indicated gameplay action has occurred, wherein selection of a respective user-selectable notification triggers access of the corresponding gaming session;
initiating transmission of respective instances of the current gameplay notification from the first and second target client device platform queues according to their respective notification schedules;
purging all respective indications of gameplay action, associated with the source user identifier, from the first and second target client device platform queues; and
in response detecting selection of a particular user-selectable notification content at a mobile device associated with the target user identifier, initiating a gaming session, associated with the source user identifier, representative of a particular indication of gameplay action that corresponds with the selection particular user-selectable notification.

2. The method of claim 1, wherein the indication includes one of a number of pending moves, a number of won games, a number of lost games, a number of rematches available, a number of newly initiated games, a game name listing, a number of game session identifiers, and a number of pending messages.

3. The method of claim 1, further comprising:
storing, in the notification configuration, notification information received from a further client device, associated with the target user identifier, and having a client device platform type that corresponds with a third target client device platform queue, the notification information pertaining to the further client device and including a corresponding notification specification including at least one of: a notification frequency from the third target client device platform queue, a notification schedule for the third target client device platform queue.

4. The method of claim 3, further comprising:
storing, in the notification configuration, the notification information received from the further client device having a client device platform type that corresponds with the third target client device platform queue occurs in response to determining the indication relates to a first use of the further client device.

5. The method of claim 1, further comprising:
providing an invitation to a respective target client device corresponding to the target user identifier, the invitation prompting a target user to subscribe to receive gameplay notifications.

6. A computer system, comprising:
a processor;
a memory device holding an instruction set executable on the processor to cause the computer systems to perform operations comprising:
receiving, from a game server, an indication of a gameplay action associated with a source user identifier;
responsive to receipt of the indication, routing the indication to one or more of a first target client device platform queue and a second target client device platform queue, the first and second target client device platform queues each having a respective notification configuration associated with a target user identifier, wherein each notification configuration includes a notification frequency and a user-defined notification schedule specific to notifications with respect to gameplay actions and specific to the respective target client device platform queue,
and wherein the target user identifier is associated with the first target client device platform queue and the second target client device platform queue, the first target client device platform being different than the second target client device platform;

analyzing the notification frequency and the notification schedules associated with the target user identifier;

responsive to analyzing the frequency of notification and the notification schedules, determining when a next gameplay notification transmission occurs;

responsive to determining when the next gameplay notification occurs, ensuring a predetermined maximum number of notifications to a client device is not exceeded;

merging the indication with any prior indications of gameplay action, associated with the source user identifier, in the first and second target client device platform queues to produce a current gameplay notification, the current gameplay notification including user-selectable notification content representative of a corresponding gaming session in which an indicated gameplay action has occurred, wherein selection of a respective user-selectable notification triggers access of the corresponding gaming session;

initiating transmission of respective instances of the current gameplay notification from the first and second target client device platform queues according to their respective notification schedules;

purging all respective indications of gameplay action, associated with the source user identifier, from the first and second target client device platform queues; and in response detecting selection of a particular user-selectable notification content at a mobile device associated with the target user identifier, initiating a gaming session, associated with the source user identifier, representative of a particular indication of gameplay action that corresponds with the selection particular user-selectable notification.

7. The computer system of claim 6, wherein the indication includes one of a number of pending moves, a number of won games, a number of lost games, a number of rematches available, a number of newly initiated games, a game name listing, a number of game session identifiers, and a number of pending messages.

8. The computer system of claim 6, further comprising:
storing, in the notification configuration, notification information received from a further client device, associated with the target user identifier, and having a client device platform type that corresponds with a third target client device platform queue, the notification information pertaining to the further client device and including a corresponding notification specification including at least one of: a notification frequency from the third target client device platform queue, a notification schedule for the third target client device platform queue.

9. The computer system of claim 8, further comprising:
storing, in the notification configuration, the notification information received from the further client device having a client device platform type that corresponds with the third target client device platform queue occurs in response to determining the indication relates to a first use of the further client device.

10. The computer system of claim 6, further comprising:
providing an invitation to a respective target client device corresponding to the target user identifier, the invitation prompting a target user to subscribe to receive gameplay notifications.

11. A non-transitory computer-readable medium storing executable instructions thereon, which, when executed by a processor, cause the processor to perform operations including:

receiving, from a game server, an indication of a gameplay action associated with a source user identifier;

responsive to receipt of the indication, routing the indication to one or more of a first target client device platform queue and a second target client device platform queue, the first and second target client device platform queues each having a respective notification configuration associated with a target user identifier, wherein each notification configuration includes a notification frequency and a user-defined notification schedule specific to notifications with respect to gameplay actions and specific to the respective target client device platform queue, and wherein the target user identifier is associated with the first target client device platform queue and the second target client device platform queue, the first target client device platform being different than the second target client device platform;

analyzing the notification frequency and the notification schedules associated with the target user identifier;

responsive to analyzing the frequency of notification and the notification schedules, determining when a next gameplay notification transmission occurs;

responsive to determining when the next gameplay notification occurs, ensuring a predetermined maximum number of notifications to a client device is not exceeded;

merging the indication with any prior indications of gameplay action, associated with the source user identifier, in the first and second target client device platform queues to produce a current gameplay notification, the current gameplay notification including user-selectable notification content representative of a corresponding gaming session in which an indicated gameplay action has occurred, wherein selection of a respective user-selectable notification triggers access of the corresponding gaming session;

initiating transmission of respective instances of the current gameplay notification from the first and second target client device platform queues according to their respective notification schedules;

purging all respective indications of gameplay action, associated with the source user identifier, from the first and second target client device platform queues; and in response detecting selection of a particular user-selectable notification content at a mobile device associated with the target user identifier, initiating a gaming session, associated with the source user identifier, representative of a particular indication of gameplay action that corresponds with the selection particular user-selectable notification.

12. The non-transitory computer-readable medium of claim 11, wherein the indication includes one of a number of pending moves, a number of won games, a number of lost games, a number of rematches available, a number of newly initiated games, a game name listing, a number of game session identifiers, and a number of pending messages.

13. The non-transitory computer-readable medium of claim 11, further comprising:
storing, in the notification configuration, notification information received from a further client device, associated with the target user identifier, and having a client device platform type that corresponds with a third target client device platform queue, the notification information pertaining to the further client device and including a corresponding notification specification including at least one of: a notification frequency from the third target client device platform queue, a notification schedule for the third target client device platform queue.

14. The non-transitory computer-readable medium of claim 13, further comprising:
storing, in the notification configuration, the notification information received from the further client device having a client device platform type that corresponds with the third target client device platform queue occurs in response to determining the indication relates to a first use of the further client device.

15. The non-transitory computer-readable medium of claim 11, further comprising:
providing an invitation to a respective target client device corresponding to the target user identifier, the invitation prompting a target user to subscribe to receive gameplay notifications.

* * * * *